United States Patent
Morris et al.

(10) Patent No.: US 9,908,264 B2
(45) Date of Patent: Mar. 6, 2018

(54) METHODS AND APPARATUS FOR RECYCLING DEPLOYED SHEET MATERIAL

(71) Applicant: RE-GEN ENTERPRISES, LLC, Meridian, ID (US)

(72) Inventors: Jeremy Blair Morris, Emmett, ID (US); Michael Dale Evenson, Meridian, ID (US)

(73) Assignee: Re-Gen Enterprises, LLC, Meridian, ID (US)

( * ) Notice: Subject to any disclaimer, the term of this patent is extended or adjusted under 35 U.S.C. 154(b) by 342 days.

(21) Appl. No.: 14/572,141

(22) Filed: Dec. 16, 2014

(65) Prior Publication Data

US 2015/0166286 A1 Jun. 18, 2015

Related U.S. Application Data

(60) Provisional application No. 61/916,934, filed on Dec. 17, 2013, provisional application No. 61/916,785, filed on Dec. 16, 2013.

(51) Int. Cl.

| | |
|---|---|
| *B29B 17/00* | (2006.01) |
| *B09B 3/00* | (2006.01) |
| *B09B 5/00* | (2006.01) |
| *A01G 13/02* | (2006.01) |
| *B29L 7/00* | (2006.01) |

(52) U.S. Cl.
CPC .......... *B29B 17/00* (2013.01); *A01G 13/0287* (2013.01); *B09B 3/00* (2013.01); *B09B 5/00* (2013.01); *A01G 2013/0218* (2013.01); *B29B 2017/0094* (2013.01); *B29L 2007/002* (2013.01); *B29L 2007/005* (2013.01); *B29L 2007/008* (2013.01); *Y02W 30/62* (2015.05)

(58) Field of Classification Search
CPC ....... B29B 17/00; A01G 13/0287; B09B 3/00; B09B 5/00; B09B 2017/0094; Y10S 242/919; B65H 16/06; B65H 16/005; B65H 19/126; B65H 2402/343; B65H 2402/42; B65H 2405/422
USPC ....................................... 242/533.8
See application file for complete search history.

(56) References Cited

U.S. PATENT DOCUMENTS 1,693,876 A * 12/1928 Unruh, Jr. .............. B65H 75/08
242/129.51
1,702,971 A * 2/1929 Jeffress .................. B65H 16/06
242/537

(Continued)

OTHER PUBLICATIONS

Ron Lyseng, The Western Producer, Roller winds up grain bag problem, 2010 [retrieved Jan. 7, 2014], retrieved from the Internet: <URL: http://www.producer.com/2010/03/roller-winds-up-grain-bag-problem/>.

(Continued)

*Primary Examiner* — Michael E Gallion
(74) *Attorney, Agent, or Firm* — The Webb Law Firm

(57) ABSTRACT

Coreless sheet material rolling apparatuses for rolling up sheet material deployed on a deployed surface into a coreless roll for recycling, and methods of rolling up sheet material deployed on a deployed surface into a coreless roll for recycling. The coreless sheet material rolling apparatuses having a main frame portion, a slide frame portion, and a winder assembly.

5 Claims, 8 Drawing Sheets

(56) References Cited

U.S. PATENT DOCUMENTS

| | | | | |
|---|---|---|---|---|
| 2,258,205 A | * | 10/1941 | Halvorson | E01C 19/482 404/110 |
| 2,346,948 A | * | 4/1944 | Shackelford | B65H 19/126 242/559.4 |
| 2,499,562 A | * | 3/1950 | Behrens | B65H 19/10 242/559.1 |
| 2,973,914 A | * | 3/1961 | Beninger | B65H 16/06 242/559.1 |
| 3,057,571 A | * | 10/1962 | Aaron | B65H 16/06 242/559.1 |
| 3,329,369 A | * | 7/1967 | Guthrie | B65H 19/126 242/559.3 |
| 3,812,918 A | * | 5/1974 | Beck | A01B 45/04 172/19 |
| 3,913,854 A | * | 10/1975 | McClure | B09B 1/004 242/422.9 |
| 3,958,772 A | * | 5/1976 | Hynson | A01D 87/127 242/557 |
| 3,968,940 A | * | 7/1976 | Godbersen | A01D 87/127 242/557 |
| 3,995,747 A | * | 12/1976 | Lewey | B65H 16/06 242/533.2 |
| 4,009,773 A | * | 3/1977 | Brenner | B65G 29/00 198/378 |
| 4,042,187 A | * | 8/1977 | Snyder | B65H 49/32 242/557 |
| 4,084,763 A | * | 4/1978 | Zamboni | A01B 45/04 242/393 |
| 4,088,277 A | * | 5/1978 | Councell | B65H 16/021 242/559.1 |
| 4,098,468 A | * | 7/1978 | Skalleberg | B65H 54/54 242/470 |
| 4,209,140 A | * | 6/1980 | Seibert | B65H 54/54 242/559 |
| 4,284,995 A | * | 8/1981 | Gordon | B65H 16/06 242/129.51 |
| 4,354,556 A | * | 10/1982 | Evans | A01B 45/04 172/19 |
| 4,447,012 A | * | 5/1984 | Woodruff | B65H 16/06 242/423.1 |
| 4,456,399 A | | 6/1984 | Conover | |
| 4,483,493 A | * | 11/1984 | Schonmeier | B65H 18/02 242/542 |
| 4,555,073 A | * | 11/1985 | Barazone | E01C 19/522 242/557 |
| 4,573,846 A | * | 3/1986 | Willbanks | A01D 87/127 242/557 |
| 4,613,094 A | * | 9/1986 | Schweitzer | B65H 54/56 242/397.2 |
| 4,657,199 A | * | 4/1987 | Barazone | B65H 23/063 242/422.4 |
| 4,664,332 A | * | 5/1987 | Barazone | E01C 19/522 242/557 |
| 4,693,433 A | * | 9/1987 | Martin | B60T 13/22 188/170 |
| 4,705,229 A | * | 11/1987 | Barazone | E01C 19/522 242/557 |
| 4,720,212 A | | 1/1988 | Steenbergen et al. | |
| 4,722,651 A | * | 2/1988 | Antal | A01D 87/127 293/117 |
| 4,740,131 A | * | 4/1988 | Mayle | B62B 3/04 212/324 |
| 4,754,815 A | * | 7/1988 | Brouwer | A01B 45/04 111/100 |
| 4,809,924 A | * | 3/1989 | Martens | B60P 3/035 224/402 |
| 4,878,542 A | * | 11/1989 | Brouwer | A01B 45/04 172/1 |
| 4,909,667 A | | 3/1990 | DeMello | |
| 5,002,235 A | * | 3/1991 | Greer | B65H 19/12 242/559.4 |
| 5,074,734 A | * | 12/1991 | Price | A01D 87/127 242/557 |
| 5,118,230 A | | 6/1992 | Justice | |
| 5,123,602 A | * | 6/1992 | Skalleberg | B65H 54/553 242/393 |
| 5,304,014 A | | 4/1994 | Slutz | |
| 5,316,427 A | * | 5/1994 | DeLong | A01D 87/127 414/24.6 |
| 5,344,089 A | * | 9/1994 | Crowley | B65H 16/06 242/417 |
| 5,378,104 A | * | 1/1995 | Payne, Jr. | B65H 19/126 242/592 |
| 5,868,340 A | * | 2/1999 | Araki | G03B 17/26 242/532.6 |
| 6,131,668 A | * | 10/2000 | Houska | A01B 45/04 172/19 |
| 6,264,400 B1 | * | 7/2001 | Gent | A01G 13/0287 405/129.75 |
| 6,299,094 B1 | * | 10/2001 | James, Jr. | A01G 13/0287 242/390 |
| 6,558,079 B1 | | 5/2003 | Kozak et al. | |
| 6,558,080 B2 | | 5/2003 | Kozak | |
| 6,575,393 B1 | * | 6/2003 | James, Jr. | A01G 13/0287 242/390 |
| 6,764,039 B1 | | 7/2004 | James, Jr. | |
| 6,786,446 B1 | * | 9/2004 | Kaul | A01G 13/0287 242/557 |
| 7,018,135 B2 | | 3/2006 | Kaul et al. | |
| 7,114,679 B1 | * | 10/2006 | Morgan | B65H 75/246 242/394.1 |
| 7,494,301 B1 | * | 2/2009 | Neaton | A01G 13/0287 405/302.6 |
| 8,375,643 B1 | | 2/2013 | Harrop et al. | |
| 2003/0150953 A1 | | 8/2003 | Gent | |
| 2004/0131454 A1 | | 7/2004 | Voghel | |
| 2004/0227031 A1 | * | 11/2004 | Yoder | B65H 16/103 242/390.5 |
| 2015/0166286 A1 | * | 6/2015 | Morris | B09B 3/00 242/533.8 |

OTHER PUBLICATIONS

YouTube Video of Ag Roller Demo_20101104.wmv, uploaded by Cole4595 on Nov. 8, 2010 [retrieved Jan. 7, 2014], retrieved from the Internet: <URL: http://www.youtube.com/watch?v=4R-0IHj08WI>.

Frank McInenly Auctions Ltd., Bagwrapper, 2012 [retrieved Jan. 7, 2014], retrieved from the Internet: <URL: http://www.mcinenly.com/2012auctions/nolte/bagwrapper.jpg>.

* cited by examiner

METHODS AND APPARATUS FOR RECYCLING DEPLOYED SHEET MATERIAL

PRIORITY/CROSS-REFERENCE TO RELATED APPLICATIONS

This application claims the benefit of U.S. Provisional Application No. 61/916,785 filed 16 Dec. 2013, and U.S. Provisional Application No. 61/916,934 filed 17 Dec. 2013, the disclosures of which are incorporated by reference.

TECHNICAL FIELD

The disclosure generally relates to the field of attachments for vehicles. Particular embodiments relate to attachments configured for rolling up sheet material deployed on a surface for recycling.

BACKGROUND

Sheet materials such as tarps and pond liners are well-known. These materials are commonly made out of synthetic rubber, polyethylene, polyvinyl chloride (PVC), and the like, and are generally supplied in large rolls. When installing such material, the roll is unwound and the material is laid out, often times over a large area.

Eventually, these sheet materials wear down, tear, and disintegrate, or are no longer needed. When this occurs, it is desirable to remove the sheet material and recycle it.

SUMMARY OF THE DISCLOSURE

Several exemplary coreless sheet material rolling apparatuses and methods of rolling up sheet material into a coreless roll for recycling are described herein.

A first exemplary coreless sheet material rolling apparatus is configured for rolling sheet material into a coreless roll. The first exemplary coreless sheet material rolling apparatus comprises a main frame portion, slide frame portion, and winder assembly. The main frame is configured to attach to a vehicle equipped with at least one arm. The main frame has a first end and a second end, as well as a first wall and a second wall. The slide frame is operably connected to the main frame, and is configured for extending away from the main frame in a generally horizontal direction with respect to a deployed surface. The slide frame is configured for moving from a retracted position to an extended position.

The winder assembly is attached to the slide frame. The winder assembly comprises an arbor shaft and a motor. The motor is capable of rotating the arbor shaft in a first rotational direction, and a second rotational direction, each direction respectively corresponding to a winding and unwinding direction.

When the slide frame is in its retracted position, the arbor shaft extends through a port in the first wall of the main frame and the arbor shaft's first end is secured, thereby preventing the arbor shaft from moving in a vertical direction with respect to the deployed surface. In the retracted position, sheet material can be rolled onto the arbor shaft. Once a desired amount of sheet material is rolled onto the arbor shaft, the slide frame can be moved to its extended position, withdrawing the arbor shaft from the center of the rolled material. Once the arbor shaft has been withdrawn, the coreless roll of sheet material remains resting on a storage surface.

Preferably, the slide frame and winder assembly are hydraulically-operated, and connected to a hydraulic control system equipped on the vehicle. The hydraulic control system allowing the vehicle's operator to move the slide frame from its retracted position to its extended position, as well as rotating the arbor shaft in a winding and unwinding direction.

A second exemplary coreless sheet material rolling apparatus is configured for rolling sheet material into a coreless roll. The second exemplary coreless sheet material rolling apparatus comprises a main frame portion, slide frame portion, and winder assembly. The main frame portion has a first end and a second end, as well as a first wall and a second wall. The main frame portion further comprises a first deflector portion on the first wall, and a second deflector portion on the second wall. The first deflector portion and second deflector portion are configured to assist in guiding the sheet material on to the winder assembly.

A third exemplary coreless sheet material rolling apparatus is configured for rolling sheet material into a coreless roll. The third exemplary coreless sheet material rolling apparatus comprises a main frame portion, slide frame portion, and winder assembly. The winder assembly comprises an arbor shaft for the sheet material to be rolled onto. The main frame portion further comprises a first end and a second end as well as a first wall and a second wall. The second wall further comprises a support for the arbor shaft. Preferably, the support is a bearing that supports the arbor shaft when it rotates in its first and second rotational directions.

A first exemplary method for rolling up sheet material for recycling comprises the steps of providing a vehicle that comprises a sheet material roller apparatus, attaching the desired sheet material thereto, rolling the material, and recycling the rolled sheet material.

A second exemplary method for rolling up sheet material for recycling comprises the steps of providing a vehicle that comprises a sheet material roller apparatus, defining a portion of sheet material to be wound, positioning the vehicle, attaching the sheet material to the sheet material roller apparatus, rolling the sheet material, and recycling the rolled sheet material.

A third exemplary method for rolling up sheet material for recycling comprises the steps of providing a vehicle that comprises a sheet material roller apparatus having an arbor shaft, positioning the vehicle adjacent the sheet material, creating at least one flap in the sheet material, attaching the flap to the arbor shaft, rotating the arbor shaft in a first direction to roll the sheet material onto the arbor shaft to form a coreless roll, stopping rotation of the arbor shaft in the first direction, determining an end of the sheet material to be rolled onto the arbor shaft, affixing the end of the sheet material to the coreless roll, rotating the arbor shaft in a second direction to loosen the coreless roll from the arbor shaft, withdrawing the arbor shaft from the coreless roll, and recycling the rolled sheet material.

Additional understanding of the apparatuses and methods contemplated and/or claimed by the inventors can be gained by reviewing the detailed description of exemplary apparatuses and methods, presented below, and the referenced drawings.

DETAILED DESCRIPTION

Figure 1:
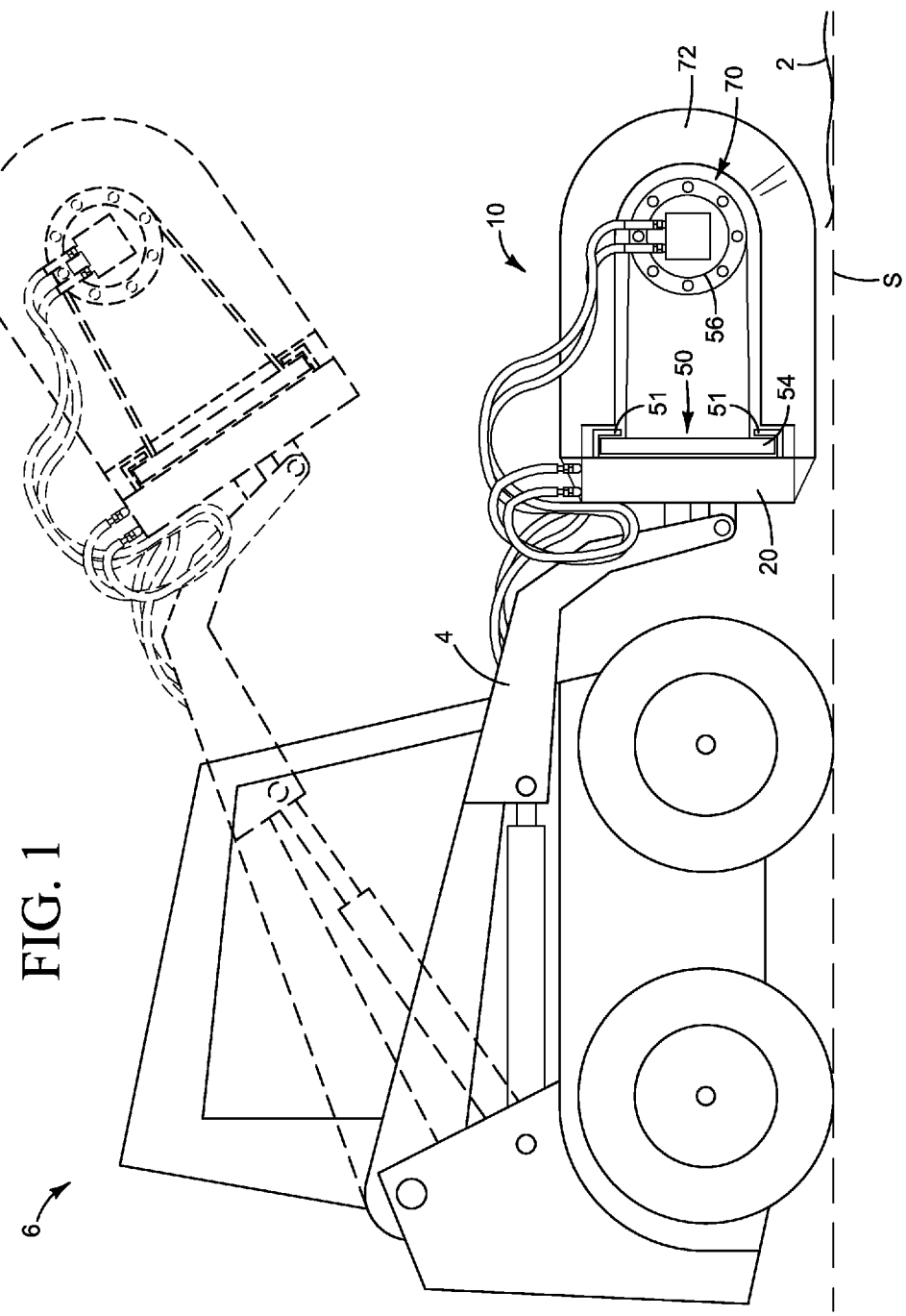
FIG. 1 is a right side elevation view of a first exemplary apparatus for rolling up sheet material for recycling.

The following description and the referenced drawings provide illustrative examples of that which the inventors regard as their invention. As such, the embodiments discussed herein are merely exemplary in nature and are not intended to limit the scope of the invention, or its protection, in any manner. Rather, the description and illustration of these embodiments serve to enable a person of ordinary skill in the relevant art to practice the invention.

The use of "e.g.," "etc," "for instance," "in example," "for example," and "or" and grammatically related terms indicates non-exclusive alternatives without limitation, unless the context clearly dictates otherwise. The use of "including" and grammatically related terms means "including, but not limited to," unless the context clearly dictates otherwise. The use of the articles "a," "an" and "the" are meant to be interpreted as referring to the singular as well as the plural, unless the context clearly dictates otherwise. Thus, for example, reference to "a winder assembly" includes two or more such winder assemblies, and the like. The use of "optionally," "alternatively," and grammatically related terms means that the subsequently described element, event or circumstance may or may not be present/occur, and that the description includes instances where said element, event or circumstance occurs and instances where it does not. The use of "preferred," "preferably," and grammatically related terms means that a specified element or technique is more acceptable than another, but not that such specified element or technique is a necessity, unless the context clearly dictates otherwise. The use of "exemplary" means "an example of" and is not intended to convey a meaning of an ideal or preferred embodiment. Words of approximation (e.g., "substantially," "generally"), as used in context of the specification and figures, are intended to take on their ordinary and customary meanings which denote approximation, unless the context clearly dictates otherwise.

The use of "skid steer" means any engine-powered vehicle with at least one lift arm, unless the context clearly dictates otherwise.

The use of "arbor shaft" means an elongated portion which holds or turns other parts that move or spin, unless the context clearly dictates otherwise.

The use of "deployed surface" means any natural or man-made surface upon which sheet material is deployed, placed, or otherwise present, including but not limited to ground surfaces, and floor surfaces, unless the context clearly dictates otherwise.

The use of "storage surface" means a surface upon which a coreless roll of sheet material is at least temporarily placed, including but not limited to a "deployed surface," ground surfaces, floor surfaces, and the surface of a trailer, unless the context clearly dictates otherwise.

The use of "sheet material" means material that is thin in comparison to its length and breadth, unless the context clearly dictates otherwise. Examples of sheet material include, but are not limited to: plastic sheeting, plastic liners, tubing, elongated plastic bags, tarps, pond liners, and the like.

The use of "recycling" means at least one part of the process of converting a waste material into reusable material, including but not limited to the steps of collecting a waste material, preparing the waste material for shipment to a recycler, and presenting the waste material to a recycler for recycling, unless the context clearly dictates otherwise.

Referring initially to FIGS. 1 through 5, a first exemplary coreless sheet material rolling apparatus 10 for rolling up sheet material for recycling is illustrated. The apparatus 10 is configured for rolling sheet material 2 deployed on a deployed surface into a coreless roll 90.

The apparatus 10 comprises a main frame 20, slide frame 50, and winder assembly 70. The main frame 20 of the apparatus 10 is configured for attachment to a vehicle 6. If the vehicle 6 has an arm or arms 4, the apparatus 10 can be attached to the vehicle's arm(s) 4. The arm(s) 4 of the vehicle 6 may be configured for being raised and lowered in relation to the deployed surface S.

The main frame 20 comprises a first end 28 and a second end 30 as well as a first wall 22 and a second wall 24. The first wall 22 defines a port 26, hole, slot, orifice, or other passageway therethrough, the port 26 configured for allowing at least a portion of an arbor shaft 52 to pass therethrough.

The slide frame 50 is operably attached to the main frame 20 in a manner that allows the slide frame to slide in a first direction X and second direction Y, relative to the main frame 20. The first direction X, and the second direction Y, are preferably generally parallel to the deployed surface S. When moving in the first direction X and the second direction Y, the slide frame 50 is slidably attached to the main frame 20 via at least one rail guide 51 extending from the main frame 20. The slide frame 50 further comprises a first end 54 and a second end 55.

Attached to the first end 54 of the slide frame 50 is a winder assembly 70 for winding the sheet material 2. The winder assembly 70 comprises an arbor shaft 52 and motor 56. The arbor shaft 52 has a first end 58 distal the motor 56, and a second end 59 proximal the motor 56. The second end 59 of the arbor shaft is operably connected to the motor 56 such that it can be rotated in a first rotational direction R1 and second rotational direction R2. Further, when the slide frame 50 slides in a first direction X, the first end 58 extends from the second wall 24 of the main frame 20. Conversely, when the slide frame 50 slides in a second direction Y, the first end 58 retracts towards the second wall 24 of the main frame 20. When extended in a first direction X, the first end 58 of the arbor shaft 52 extends up to and through the port 26.

In the exemplary apparatus 10 illustrated in these figures, the arbor shaft 52 is operably connected to the motor 56 in a manner allowing the arbor shaft 52 to rotate in a first rotational direction R1 and second rotational direction R2. When the slide frame 50 extends in its first direction X, the arbor shaft 52 and motor 56 move with the slide frame 50 in the first direction X. When the slide frame 50 is moved in the first direction X, the first end 58 of the arbor shaft 52 moves away from the second wall 24 of the main frame 20, and will slide through the port 26 defined through the first wall 22 of the main frame 20. Conversely, when the slide frame 50 extends in its second direction Y, the arbor shaft 52 and motor 56 also move with the slide frame 50 in the second direction Y. In this direction, the first end 58 of the arbor shaft 52 is moved towards and is brought into contact with the second wall 24 of the main frame 20.

Figure 2:
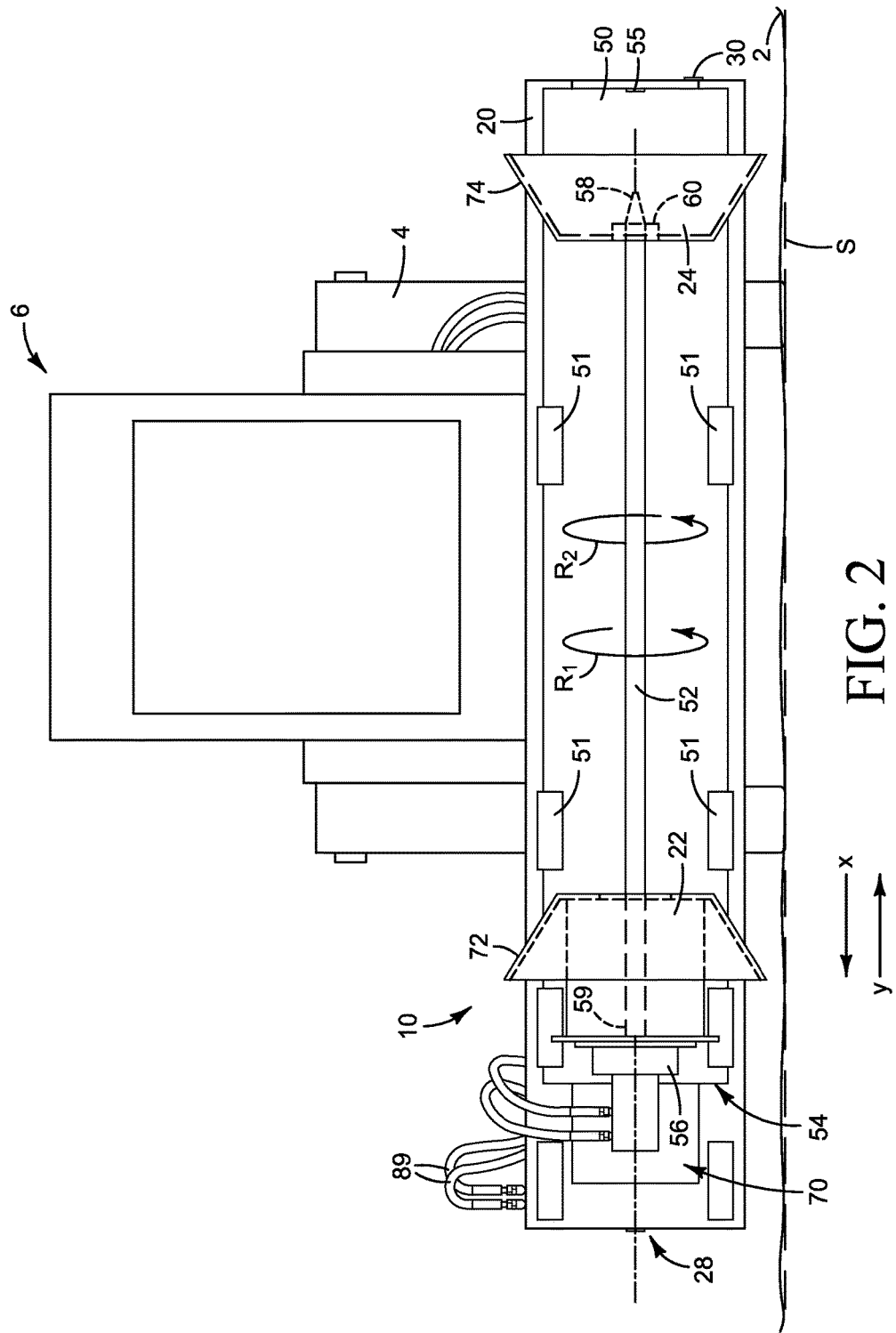
FIG. 2 is a first front side elevation view of the apparatus of FIG. 1, illustrating the winder assembly fully extended in its inward direction with no sheet material wound on the arbor shaft.
Figure 4:
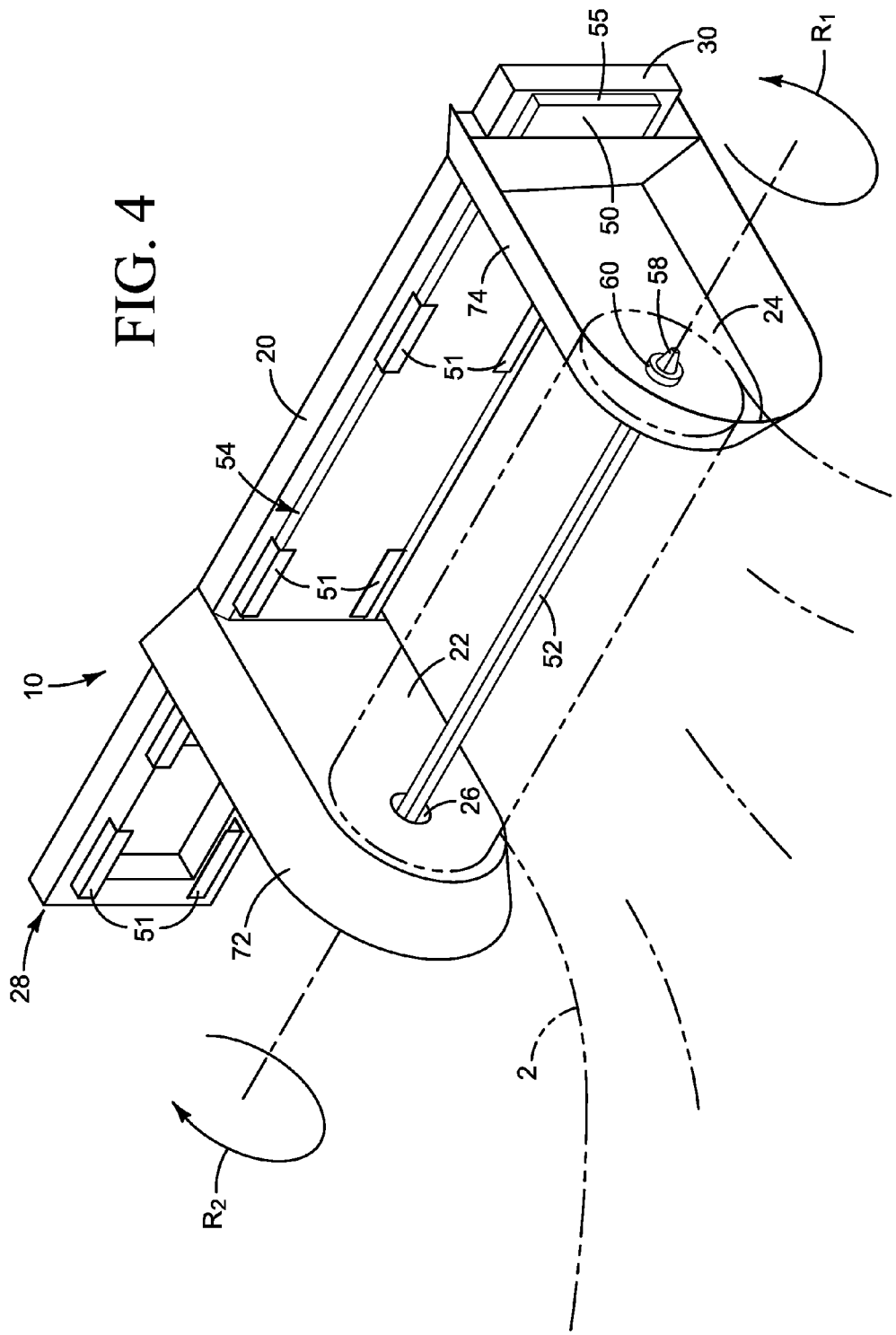
FIG. 4 is a first partial, front side perspective view of the apparatus of FIG. 1, illustrating the slide frame in its retracted position with sheet material wound on the arbor shaft in a coreless roll.

When the apparatus 10 is used to roll sheet material 2, the slide frame 50 is slid in a second direction Y such that the first end 58 of the arbor shaft 52 retracts towards the second wall 24 of the main frame 20. This retracted position is illustrated in FIGS. 2 and 4. Once in the retracted position, a portion of the sheet material 2 is attached to the arbor shaft 52. The arbor shaft 52 can then be rotated in a first rotational direction R1, causing sheet material 2 to be rolled onto the arbor shaft 52 into a coreless roll 90.

Figure 3:
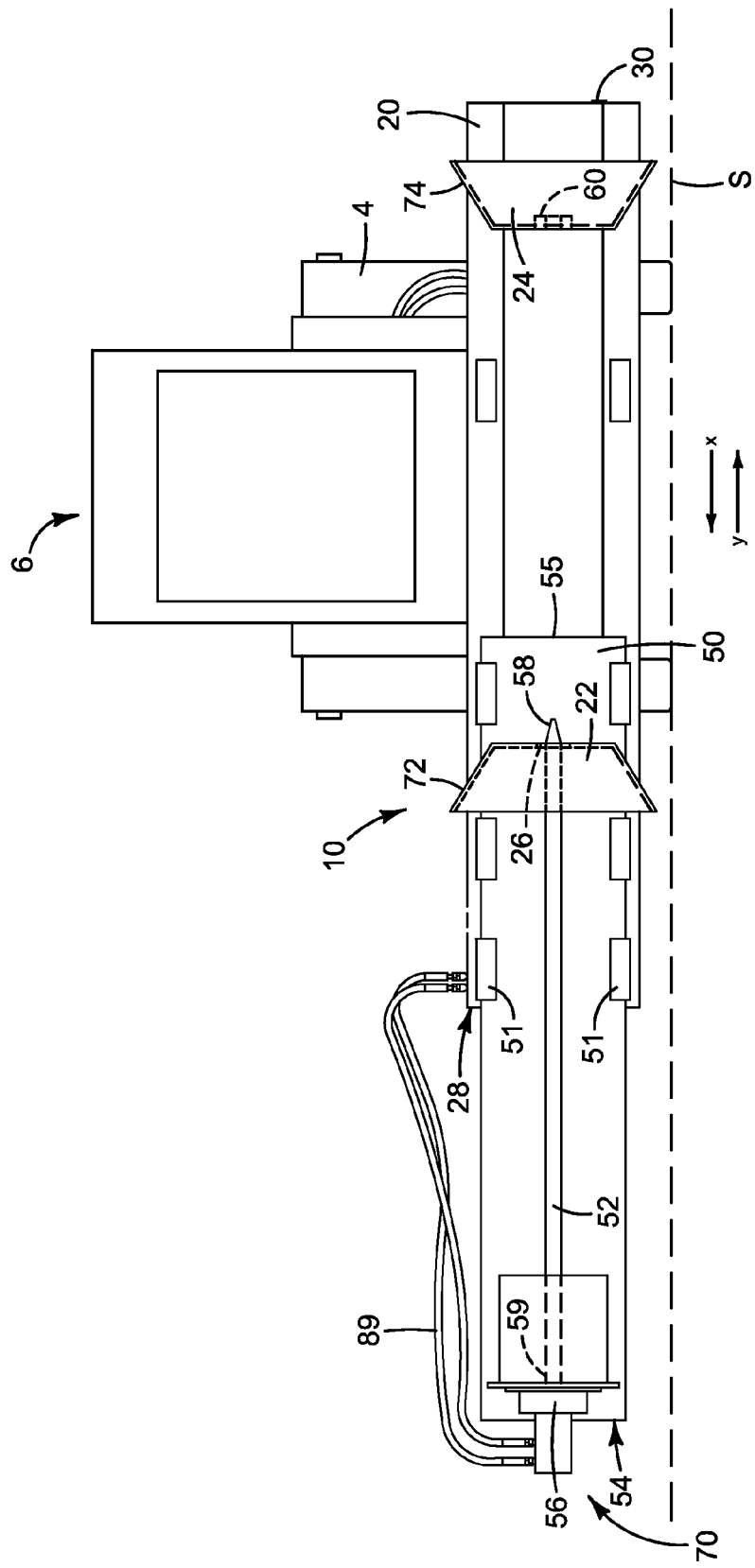
FIG. 3 is a second front side elevation view of the apparatus of FIG. 1, illustrating the slide frame in its retracted position with no sheet material wound on the arbor shaft.
Figure 5:
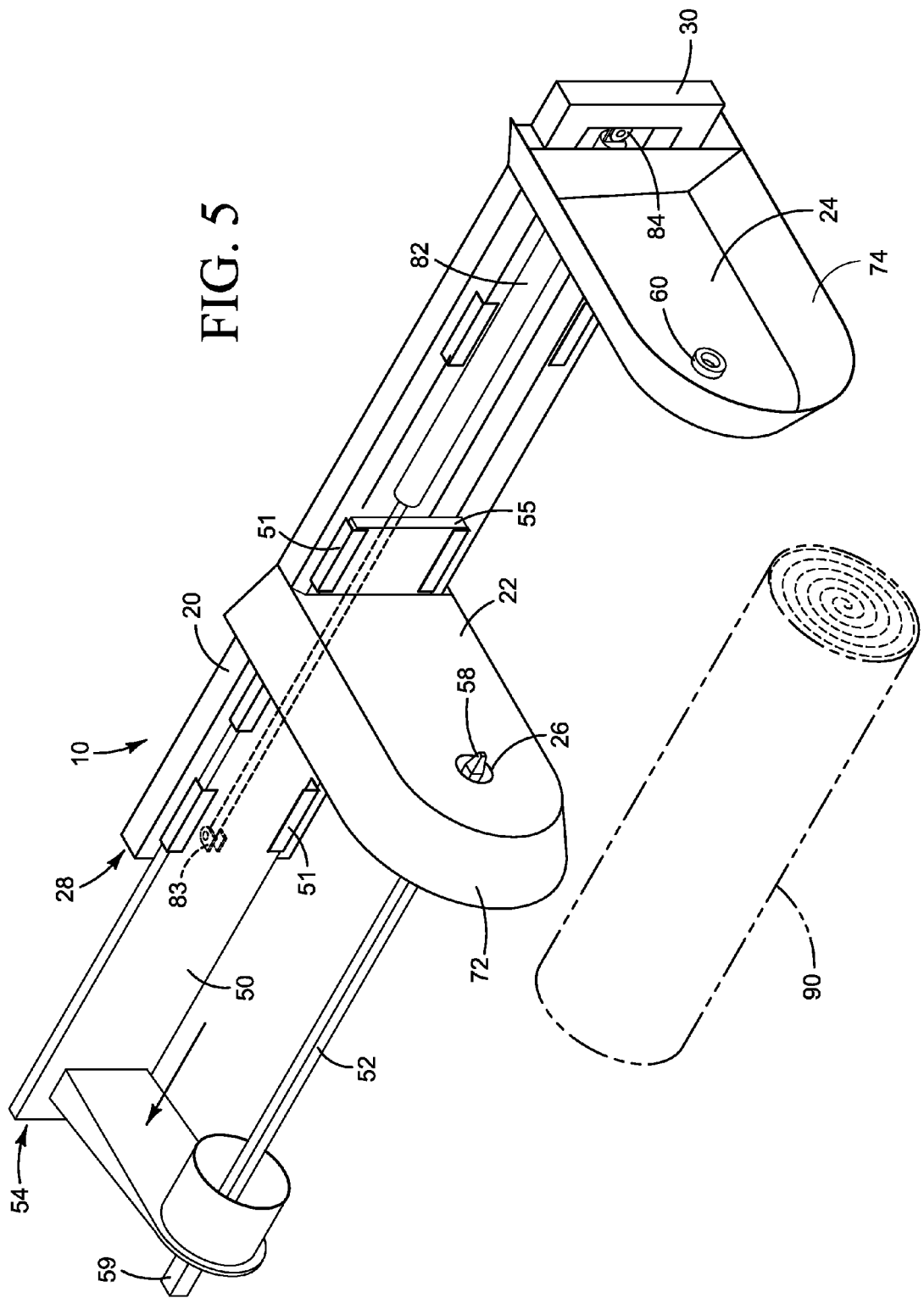
FIG. 5 is a second partial, front side perspective view of the apparatus of FIG. 1, illustrating the slide frame in its extended position with the arbor shaft withdrawn from the coreless roll of sheet material.

Once the desired amount of sheet material 2 has been collected into a coreless roll 90 onto the arbor shaft 52, the slide frame 50 can be moved from its retracted position to its extended position, resulting in the sliding the arbor shaft 52 out of the coreless roll 90 so that the arbor shaft 52 no longer extends into the coreless roll 90. This extended position is illustrated in FIGS. 3 and 5. Removing the arbor shaft 52 from the coreless roll 90 allows the coreless roll 90 to be unloaded from the apparatus 10. The coreless roll 90 can then be recycled.

Optionally, the apparatus 10 comprises a hydraulic control system 80 configured for moving the slide frame 50 from its retracted position to its extended position. The hydraulic control system 80 comprises a hydraulic power source configured for supplying hydraulic fluid to at least one hydraulic cylinder 82 via hydraulic lines 89. The hydraulic cylinder 82 having a first end 83 attaching to the slide frame 50, and a second end 84 attaching to the main frame 20. The hydraulic cylinder 82 configured for extending and retracting, thereby moving the slide frame 50 in direction X from its retracted position to its extended position, and in direction Y from its extended position to its retracted position.

Optionally, the hydraulic control system 80 further comprises controls enabling a vehicle operator to move the slide frame 50 in direction X from its retracted position to its extended position, and in direction Y from its extended position to its retracted position.

Optionally, if motor 56 is a hydraulic motor, the hydraulic control system 80 can also be utilized for making the arbor shaft rotation in a first rotational direction R1 and rotate in a second rotational direction R2 In such a configuration, the hydraulic power source supplies hydraulic fluid via hydraulic lines 89 to the motor 56.

FIG. 1 illustrates a coreless sheet material rolling apparatus attached to a vehicle 6 with at least one arm 4. The coreless sheet material rolling apparatus of FIG. 1 is capable of being raised in a vertical direction, with respect to the ground S, and comprises a main frame 20, slide frame 50, and winder assembly 70, the winder assembly further comprises a motor 56.

FIG. 2 illustrates the apparatus 10 fully extended in its inward direction. The apparatus 10 comprises a main frame 20, slide frame 50, and winder assembly 70, the winder assembly 70 further comprises a motor 56 and arbor shaft 52 running generally parallel to the deployed surface S. The arbor shaft 52 comprises a first end 58 and second end 59, the first end 58 configured for engaging a support 60. In this position, the apparatus 10 is ready to roll sheet material 2; the support 60 adds extra stability to the arbor shaft 52 when rotated in a first rotational direction R1 and second rotational direction R2. Further, FIG. 2 illustrates the main frame's first deflector portion 72 and second deflector portion 74. These portions help guide sheet material 2 onto the arbor shaft 52 when collected.

FIG. 3 illustrates the apparatus 10 fully retracted in its outward direction. The apparatus 10 comprises a main frame 20, slide frame 50, and winder assembly 70, the winder assembly further comprises a motor 56 and arbor shaft 52 running generally parallel to the deployed surface S. The arbor shaft 52 comprises a first end 58 and second end 59, the second end retracted from the support 60. In this position, the apparatus 10 is not prepared to roll sheet material 2. Rather, this position is illustrative of the apparatus 10 having unloaded a coreless roll 90 of sheet material 2. To unload sheet material 2, the slide frame 50 is extended in a first direction X, relative to the main frame 20. The slide frame 50 is guided by at least one rail guide 51, preventing the slide frame 50 from detaching from the main frame 20. The at least one rail guide 51 also guides the slide frame when retraced in a second direction Y.

FIG. 4 illustrates the winder assembly 70 of the apparatus 10 fully extended in its inward direction with the arbor shaft 52 holding a coreless roll 90 of sheet material 2. To collect a coreless roll 90 of sheet material 2, the first end 58 of the arbor shaft 52 is extended through the support 60. Once engaged, the arbor shaft 52 is rotated in a first rotational direction R1 such that sheet material 2 accumulates about the arbor shaft 52.

FIG. 5 illustrates the winder assembly 70 of the apparatus 10 fully retraced in its outward direction with a coreless roll 90 of sheet material 2 unloaded nearby onto a storage surface. In this Figure, the storage surface is the same surface as the deployed surface S. To unload the coreless roll 90 of sheet material 2, the first end of the arbor shaft 52 is retraced from the support 60 and towards the port 26. The first end 58 extends up to and through the port 26. When retracting, the sheet material 2 is forced against the first wall 22 of the main frame 20. This force allows the arbor shaft 52 to overcome any frictional forces holding it to the sheet material 2. Once any forces are overcome, a coreless roll 90 of sheet material 2 remains on the storage surface.

FIGS. 1 through 5 also illustrate a second exemplary coreless sheet material rolling apparatus for rolling up sheet material for recycling. The second exemplary coreless sheet material rolling apparatus is similar to the first exemplary coreless sheet material rolling apparatus 10 described above, except as detailed below. The second exemplary coreless sheet material rolling apparatus includes a first deflector portion 72 and a second deflector portion 74 for guiding the sheet material 2 onto the arbor shaft 52. The deflector portions 72, 74 run generally perpendicular to the arbor shaft 52 and are flared to assist in guiding the sheet material 2 onto the arbor shaft 52 during the rolling process. Further, the deflector portions 72, 74 extend from the first wall 22 and second wall 24 in a curved fashion. Both the first deflector portion 72 and second deflector portion 74 flare in an outward direction such that the first deflector portion 72 flares towards the first end 28 of the main frame 20 and the second deflector portion 74 flares towards the second end 30 of the main frame 20. Both deflector portions 72, 74 flare far enough to provide first wall 22 and second wall 24 extra support while preventing interference with collecting sheet material 2.

FIGS. 1 through 5 also illustrate a third exemplary coreless sheet material rolling apparatus for rolling up sheet material for recycling. The third exemplary coreless sheet material rolling apparatus is similar to the first exemplary coreless sheet material rolling apparatus 10 described above, except includes a support 60 attached to, or defined in, the second wall 24 of the main frame 20. The support 60 providing support for the first end 58 of the arbor shaft 52. The support 60 can comprise a bearing, or other such support. When the slide frame 50 is in its retracted position, the first end 58 of the arbor shaft 52 engages the support 60, aiding the arbor shaft 52 in rotating in a first rotational direction R1 and second rotational direction R2.

In addition to acting as a rotational aid, the support 60 increases the load-bearing capability of the arbor shaft 52. When engaged with the support 60, the arbor shaft 52 is capable of collecting a larger mass of sheet material 2. Further, the support 60 acts as a stabilization device for the arbor shaft 52. When engaged with the support 60, the arbor shaft 52 becomes more rigid, in addition to being able collect a larger mass of sheet material 2.

Figure 6:
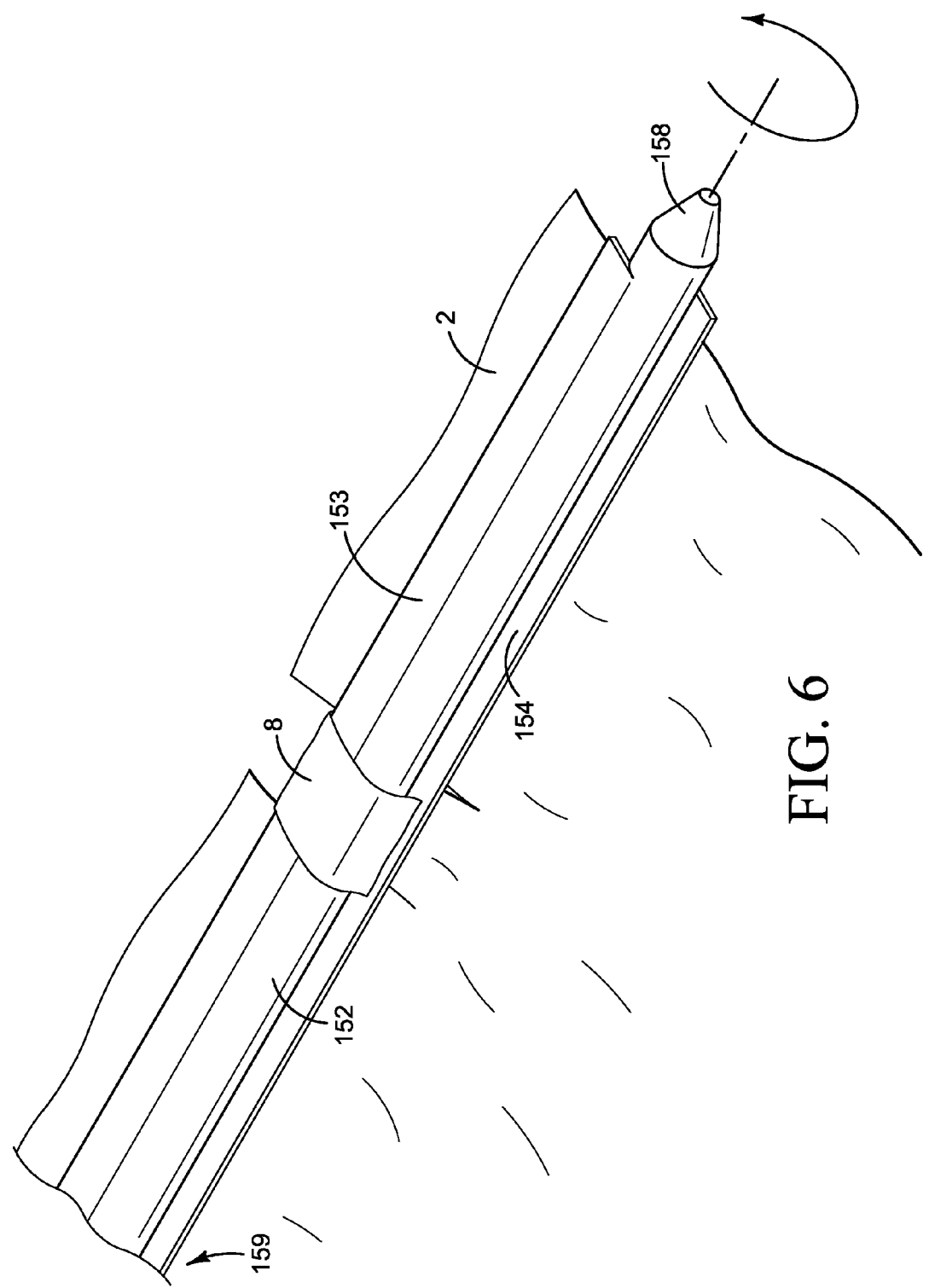
FIG. 6 is a partial, first side perspective view of a second exemplary arbor shaft.

Referring now to FIG. 6, FIG. 6 illustrated is a partial, first side perspective view of a second exemplary arbor shaft 152. The second exemplary arbor shaft 152 could be utilized with the first exemplary coreless sheet material rolling apparatus illustrated in FIGS. 1 through 5. The arbor shaft 152 comprising a first end 158 distal the motor, and a second end 159 proximal the motor. The second end 159 of the arbor shaft 152 is operably connected to the motor such that it can be rotated in a first rotational direction and a second rotational direction. The arbor shaft 152 generally cylindrical in shape, having a pair of tangential flanges (153, 154) extending therefrom.

In use, a portion of sheet material 2, for instance a flap 8 defined in the sheet material 2, can be wrapped around the arbor shaft 152. Upon rotation of the arbor shaft 152 in a first rotational direction, the sheet material 2 is held in place, and the sheet material 2 is able to be wound onto the arbor shaft 152. The flap 8 illustrated in FIG. 6 could be created by making at least one incision in the sheet material 2 to create an attached flap or tab.

In use of the first exemplary arbor shaft 52 of FIGS. 1 through 5, a portion of sheet material 2, for instance a flap defined in the sheet material 2, can be wrapped around the arbor shaft 52. Upon rotation of the arbor shaft 52 in a first rotational direction R1, the sheet material 2 is held in place, and the sheet material 2 is able to be wound onto the arbor shaft 52. Such a flap could be created by making at least one incision in the sheet material 2 to create an attached flap or tab.

Referring back to FIGS. 1 through 5, once the desired amount of sheet material 2 has been collected, the arbor shaft 52, the winder assembly 70 is extended in a first direction X. By extending the winder assembly 70 in this direction, the rolled sheet material is forced to make contact with the first wall 22 of the main frame 20. The force exerted by the sheet material 2 against the first wall 22 of the main frame 20 allows the arbor shaft 52 to retract from the center of the rolled sheet material 2. The result is a coreless roll 90 of sheet material 2 resting on the storage surface.

Any suitable structure and/or material can be used for components of the exemplary coreless sheet material rolling apparatus, and a skilled artisan will be able to select an appropriate structure and material for the coreless sheet material rolling apparatus in a particular embodiment based on various considerations, including the intended use of the exemplary coreless sheet material rolling apparatus, the intended arena within which the coreless sheet material rolling apparatus will be used, and the equipment and/or accessories with which the coreless sheet material rolling apparatus is intended to be used, among other considerations.

Figure 7:
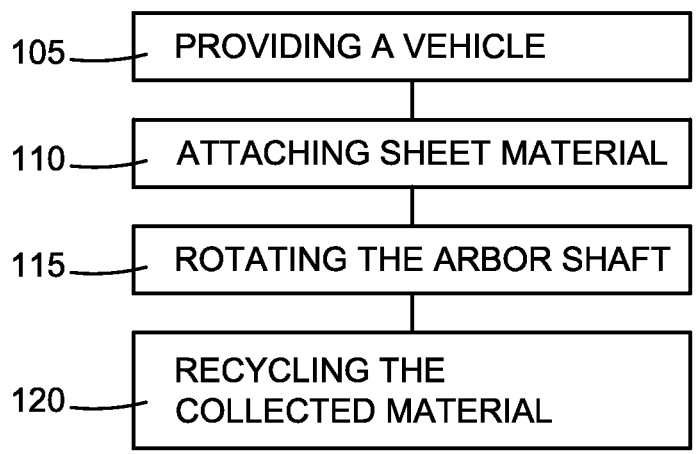
FIG. 7 is a first flowchart illustrating the steps in a first exemplary method for rolling up sheet material deployed on a deployed surface into a coreless roll for recycling.

Referring now to FIG. 7, a first exemplary method 100 of rolling up sheet material for recycling is illustrated. Method 100 includes the steps of: providing a vehicle comprising a sheet material roller apparatus having an arbor shaft (step 105), attaching the sheet material to the sheet material roller apparatus (step 110), rotating the arbor shaft in a first direction to roll the sheet material onto the arbor shaft to form a coreless roll (step 115), and recycling the rolled sheet material (step 120).

In the providing a vehicle comprising a sheet material roller apparatus having an arbor shaft step (step 105), the sheet material roller apparatus could comprise a winder assembly having a rotationally driven arbor shaft and be configured for raising and lowering the roller apparatus relative to the deployed surface.

In the attaching the sheet material to the sheet material roller apparatus step (step 110), the sheet material is first extended to the vehicle's arbor shaft. Once the material has been extended to the arbor shaft, it is attached in one of two ways. First, the sheet material can be attached by manually wrapping its first end about the arbor shaft. After the sheet material has been wrapped, a vehicle operator momentarily engages the arbor shaft in its first rotational direction. This momentarily process secures the first end of the sheet material to the arbor shaft by wrapping additional sheet material on top of it.

After providing a vehicle comprising a sheet material roller apparatus having an arbor shaft, the sheet material is attached thereto. The step of attaching the sheet material to the sheet material roller apparatus (step 110) further comprises the steps of extending the sheet material to the sheet material roller apparatus, connecting the sheet material to the sheet material roller apparatus's arbor shaft, and momentarily rotating the arbor shaft to ensure attachment. To attach the sheet material to the sheet material roller apparatus, the first end of the sheet material is extended towards and up to the vehicle's arbor shaft.

Alternatively, sheet material can be secured to the arbor shaft by feeding the first end of material through the arbor shaft's connector, if a connector is present. Once the first end of sheet material is fed through the connector, the vehicle operator momentarily engages the arbor shaft its first rotational direction. This momentary process, like before, secures the first end of the sheet material to the arbor shaft by wrapping additional material on top, preventing the first end from escaping the connector.

In the rotating the arbor shaft in a first direction to roll the sheet material onto the arbor shaft to form a coreless roll step (step 115), the vehicle operator must first raise the roller apparatus above the deployed surface to a height determined by the amount of sheet material to be collected. This is done by utilizing the vehicle's lift system. A skilled artisan is able to select the appropriate height to raise the roller apparatus to, depending on the amount of sheet material sought to be collected.

After raising the roller apparatus above the deployed surface, he or she manually engages the vehicle's arbor shaft in a first rotational direction. By engaging the arbor shaft in this direction, the sheet material is collected about the arbor shaft and continues to do so until instructed otherwise by the vehicle operator. Once the desired amount of sheet material is collected the vehicle operator ceases the arbor shaft from rotating in its first rotational direction; this can occur at any time in the rolling process. Again, a skilled artisan is able to select the appropriate time to cease the arbor shaft's rotation, depending on the amount of sheet material sought to be collected.

Finally, once the desired amount of sheet material has accumulated about the arbor shaft, the vehicle operator lowers the roller apparatus back to the deployed surface so that the rolled sheet material is resting upon the deployed surface.

In the recycling the rolled sheet material step (step 120), the vehicle's arbor shaft is first removed from the rolled sheet material. To slide the arbor shaft out from the center of the rolled sheet material, the vehicle operator extends the arbor shaft in a first direction. By moving the arbor shaft in this direction, the rolled sheet material is braced against the vehicle's main frame, allowing the arbor shaft to overcome any frictional force exerted upon it by the rolled sheet material. Once this force, if any, is overcome, the arbor shaft extends out from the rolled sheet material, leaving the coreless roll resting on the deployed surface. At this point, the rolled sheet material may be collected and transported to a recycler in such a manner that the recycler need not unwind the coreless roll of material to remove a core.

Figure 8:
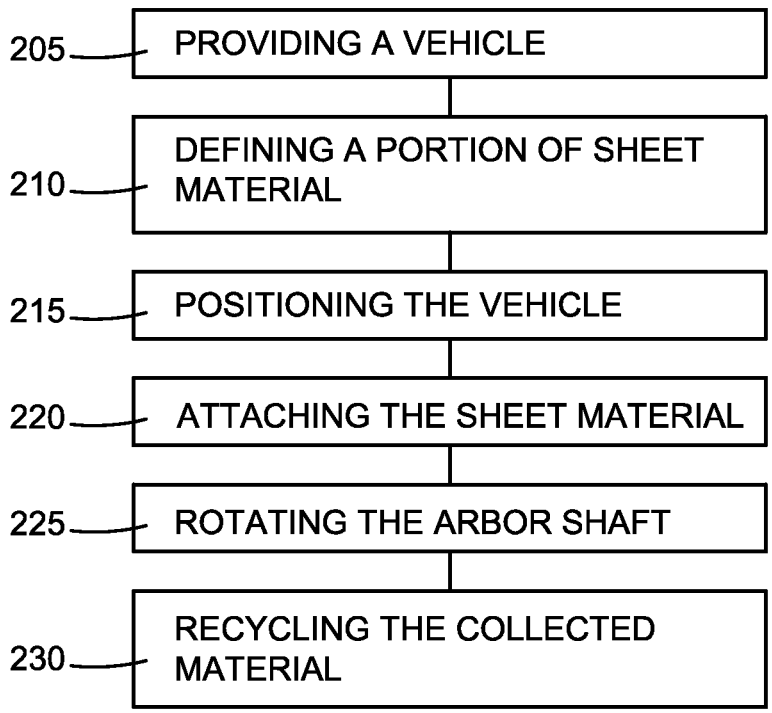
FIG. 8 is a second flowchart illustrating the steps in a second exemplary method for rolling up sheet material deployed on a deployed surface into a coreless roll for recycling.

Referring now to FIG. 8, a second exemplary method 200 of rolling up sheet material for recycling is illustrated. Method 200 includes the steps of: providing a vehicle comprising a sheet material roller apparatus having an arbor shaft (step 205), defining a portion of sheet material to be wound (step 210), positioning the vehicle adjacent the sheet material (step 215), attaching the sheet material to the sheet material roller apparatus (step 220), rotating the arbor shaft in a first direction to roll the sheet material onto the arbor shaft to form a coreless roll (step 225), and recycling the rolled sheet material (step 230).

In the providing a vehicle comprising a sheet material roller apparatus having an arbor shaft step (step 205), the sheet material roller apparatus could comprise a winder assembly having a rotationally driven arbor shaft and be configured for raising and lowering the roller apparatus relative to the deployed surface.

In the defining a portion of sheet material to be wound step (step 210), sheet material sought to be collected is identified and the size of the desired coreless roll is determined. In determining the size of the desired coreless roll, a skilled artisan could weigh considerations such as the length of the sheet material, the weight of the sheet material, or the type of material. Depending on the factors considered, the maximum coreless roll size is ultimately dictated by the space between the roller apparatus' arbor shaft and main frame's first wall and second wall.

In the positioning the vehicle adjacent the sheet material step (step 215), the vehicle can be positioned next to the material in a manner that it can be collected. To be collected, the vehicle must be close enough to the sheet material so that a first end of the material can be extended to the arbor shaft.

In the attaching the sheet material to the sheet material roller apparatus step (step 220), the sheet material is first extended to the vehicle's arbor shaft. Once the material has been extended to the arbor shaft, it is attached in one of two ways. First, the sheet material can be attached by manually wrapping its first end about the arbor shaft. After the sheet material has been wrapped, a vehicle operator momentarily engages the arbor shaft in its first rotational direction. This momentarily process secures the first end of the sheet material to the arbor shaft by wrapping additional sheet material on top of it.

After providing a vehicle comprising a sheet material roller apparatus having an arbor shaft, the sheet material is attached thereto. The step of attaching the sheet material to the sheet material roller apparatus (step 220) further comprises the steps of extending the sheet material to the sheet material roller apparatus, connecting the sheet material to the sheet material roller apparatus's arbor shaft, and momentarily rotating the arbor shaft to ensure attachment. To attach the sheet material to the sheet material roller apparatus, the first end of the sheet material is extended towards and up to the vehicle's arbor shaft.

Alternatively, sheet material can be secured to the arbor shaft by feeding the first end of material through the arbor shaft's connector, if a connector is present. Once the first end of sheet material is fed through the connector, the vehicle operator momentarily engages the arbor shaft its first rotational direction. This momentary process, like before, secures the first end of the sheet material to the arbor shaft by wrapping additional material on top, preventing the first end from escaping the connector.

In the rotating the arbor shaft in a first direction to roll the sheet material onto the arbor shaft to form a coreless roll step (step 225), the vehicle operator must first raise the roller apparatus above the deployed surface to a height determined by the amount of sheet material to be collected. This is done by utilizing the vehicle's lift system. A skilled artisan is able to select the appropriate height to raise the roller apparatus to, depending on the amount of sheet material sought to be collected.

After raising the roller apparatus above the deployed surface, he or she manually engages the vehicle's arbor shaft in a first rotational direction. By engaging the arbor shaft in this direction, the sheet material is collected about the arbor shaft and continues to do so until instructed otherwise by the vehicle operator. Once the desired amount of sheet material is collected the vehicle operator ceases the arbor shaft from rotating in its first rotational direction; this can occur at any time in the rolling process. Again, a skilled artisan is able to select the appropriate time to cease the arbor shaft's rotation, depending on the amount of sheet material sought to be collected.

Finally, once the desired amount of sheet material has accumulated about the arbor shaft, the vehicle operator lowers the roller apparatus back to a storage surface so that the rolled sheet material is resting upon the storage surface.

In the recycling the rolled sheet material step (step 230), the vehicle's arbor shaft is first removed from the rolled sheet material. To slide the arbor shaft out from the center of the rolled sheet material, the vehicle operator extends the arbor shaft in a first direction. By moving the arbor shaft in this direction, the rolled sheet material is braced against the vehicle's main frame, allowing the arbor shaft to overcome any frictional force exerted upon it by the rolled sheet material. Once this force, if any, is overcome, the arbor shaft extends out from the rolled sheet material, leaving the coreless roll resting on a storage surface. At this point, the rolled sheet material may be collected and transported to a recycler in such a manner that the recycler need not unwind the coreless roll of material to remove a core.

Figure 9:
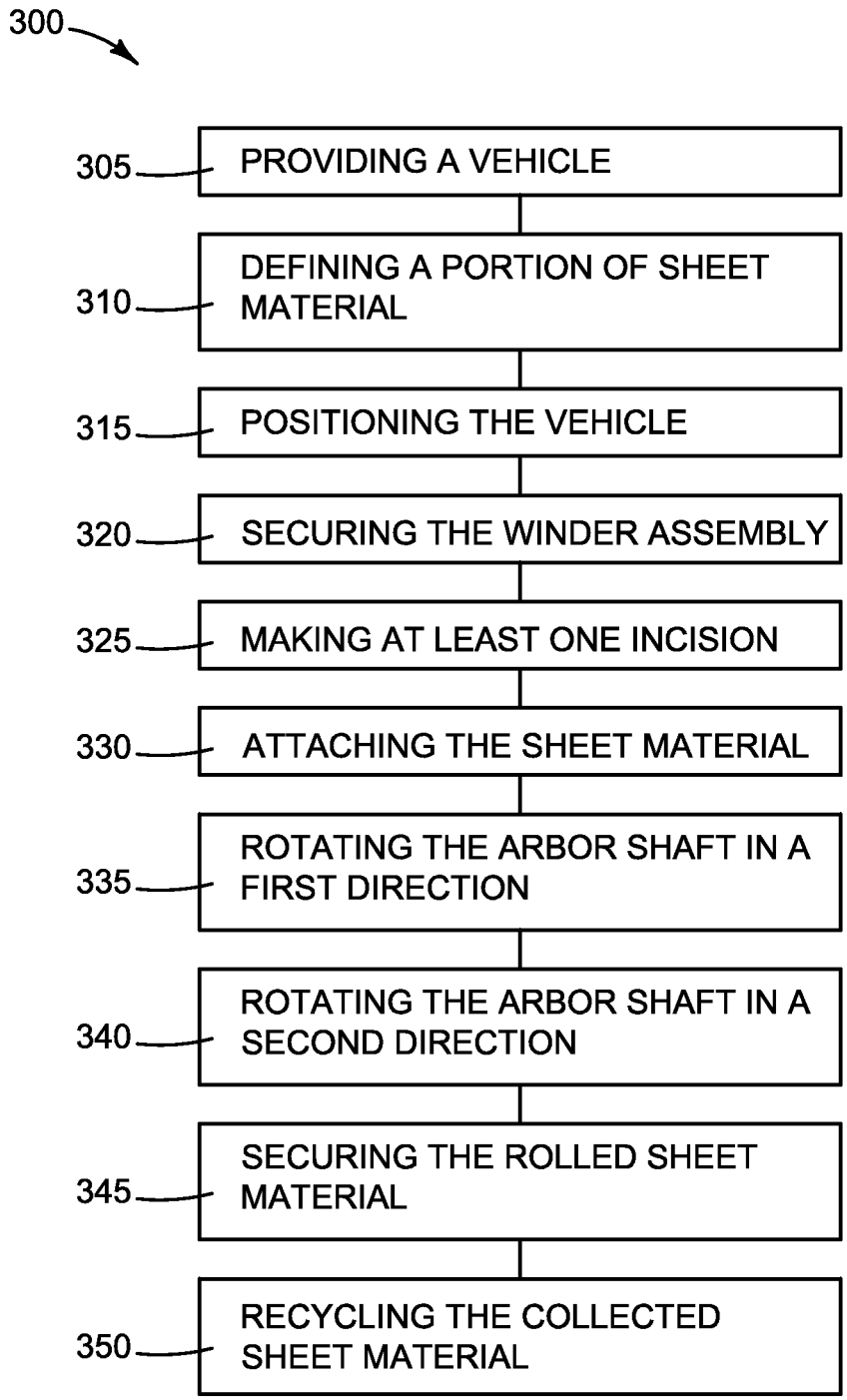
FIG. 9 is a third flowchart illustrating the steps in a third exemplary method for rolling up sheet material deployed on a deployed surface into a coreless roll for recycling.

Referring now to FIG. 9, a third exemplary method 300 of rolling up sheet material for recycling is illustrated. Method 300 includes the steps of: providing a vehicle comprising a sheet material roller apparatus having an arbor shaft (step 305), defining a portion of sheet material to be wound (step 310), positioning the vehicle adjacent the sheet material (step 315), securing the winder assembly of the roller apparatus to a support (step 320), creating at least one flap in the sheet material (step 325), attaching the sheet material to the sheet material roller apparatus (step 330), rotating the arbor shaft in a first direction to roll the sheet material onto the arbor shaft to form a coreless roll (step 335), rotating the arbor shaft in a second direction to loosen the coreless roll from the arbor shaft (step 340), securing the rolled sheet material (step 345), and recycling the rolled sheet material (step 350).

In the providing a vehicle comprising a sheet material roller apparatus having an arbor shaft step (step 305), the sheet material roller apparatus could comprise a winder assembly having a rotationally driven arbor shaft and be configured for raising and lowering the roller apparatus relative to the deployed surface.

In the defining a portion of sheet material to be wound step (step 310), sheet material sought to be collected is identified and the size of the desired coreless roll is determined. In determining the size of the desired coreless roll, a skilled artisan could weigh considerations such as the length of the sheet material, the weight of the sheet material, or the type of material. Depending on the factors considered, the maximum coreless roll size is ultimately dictated by the space between the roller apparatus' arbor shaft and main frame's first wall and second wall.

In the positioning the vehicle adjacent the sheet material step (step 315), the vehicle can be positioned next to the material in a manner that it can be collected. To be collected, the vehicle must be close enough to the sheet material so that a first end of the material can be extended to the arbor shaft.

In the securing the winder assembly of the roller apparatus to a support step (step 320), the vehicle operator extends the vehicle's winder assembly in a second direction until the arbor shaft makes contact with the support. Once contact is made between the arbor shaft and support, the arbor shaft is reinforced and capable of bearing a larger mass of rolled sheet material.

In the creating at least one flap in the sheet material step (step 325), the sheet material is more effectively prepared for attachment to the vehicle's arbor shaft. By creating at least one incision in the sheet material to define a flap, the flap created can utilized to connect the sheet material to the arbor shaft In the attaching the sheet material to the sheet material roller apparatus step (step 330), the sheet material is first extended to the vehicle's arbor shaft. Once the material has been extended to the arbor shaft, it is attached in one of two ways. First, the sheet material can be attached by manually wrapping its first end about the arbor shaft. After the sheet material has been wrapped, a vehicle operator momentarily engages the arbor shaft in its first rotational direction. This momentarily process secures the first end of the sheet material to the arbor shaft by wrapping additional sheet material on top of it.

After providing a vehicle comprising a sheet material roller apparatus having an arbor shaft, the sheet material is attached thereto. The step of attaching the sheet material to the sheet material roller apparatus (step 330) further comprises the steps of extending the sheet material to the sheet material roller apparatus, connecting the sheet material to the sheet material roller apparatus's arbor shaft, and momentarily rotating the arbor shaft to ensure attachment. To attach the sheet material to the sheet material roller apparatus, the first end of the sheet material is extended towards and up to the vehicle's arbor shaft.

Alternatively, sheet material can be secured to the arbor shaft by feeding the first end of material through the arbor shaft's connector, if a connector is present. Once the first end of sheet material is fed through the connector, the vehicle operator momentarily engages the arbor shaft its first rotational direction. This momentary process, like before, secures the first end of the sheet material to the arbor shaft by wrapping additional material on top, preventing the first end from escaping the connector.

In the rotating the arbor shaft in a first direction to roll the sheet material onto the arbor shaft to form a coreless roll step (step 335), the vehicle operator must first raise the roller apparatus above the deployed surface to a height determined by the amount of sheet material to be collected. This is done by utilizing the vehicle's lift system. A skilled artisan is able to select the appropriate height to raise the roller apparatus to, depending on the amount of sheet material sought to be collected.

After raising the roller apparatus above the deployed surface, he or she manually engages the vehicle's arbor shaft in a first rotational direction. By engaging the arbor shaft in this direction, the sheet material is collected about the arbor shaft and continues to do so until instructed otherwise by the vehicle operator. Once the desired amount of sheet material is collected the vehicle operator ceases the arbor shaft from rotating in its first rotational direction; this can occur at any time in the rolling process. Again, a skilled artisan is able to select the appropriate time to cease the arbor shaft's rotation, depending on the amount of sheet material sought to be collected.

Finally, once the desired amount of sheet material has accumulated about the arbor shaft, the vehicle operator lowers the roller apparatus back to a storage surface so that the rolled sheet material is resting upon the storage surface.

In the rotating the arbor shaft in a second direction to loosen the coreless roll from the arbor shaft step (step 340), the vehicle operator momentarily unwinds the rolled sheet material by engaging the vehicle's arbor shaft in its second rotational direction. By rotating the arbor shaft in this direction, the center of the rolled sheet material begins to unwind. This unwinding motion releases the inner portion of the rolled sheet material from the arbor shaft, removing any frictional contact. This allows for the arbor shaft to slide out without disturbing the inner-most portion of material, allowing for a more seamless recycling process.

In the securing the rolled sheet material step (step 345), the vehicle operator secures the free end of the coreless roll of sheet material to the coreless roll. This could be done through any number of ways, and a skilled artisan will be able to select an appropriate method of securing the free end in a particular embodiment based on various considerations. For instance, the skilled artisan could drill a plurality of long screws through the free end and into the coreless roll, thereby securing the free end to the coreless roll and preventing unwinding thereof. In a second example, the skilled artisan could use an adhesive or a strip of tape to adhere the free end to the coreless roll, thus preventing it from unrolling.

In the recycling the rolled sheet material step (step 350), the vehicle's arbor shaft is first removed from the rolled sheet material. To slide the arbor shaft out from the center of the rolled sheet material, the vehicle operator extends the arbor shaft in a first direction. By moving the arbor shaft in this direction, the rolled sheet material is braced against the vehicle's main frame, allowing the arbor shaft to overcome any frictional force exerted upon it by the rolled sheet material. Once this force, if any, is overcome, the arbor shaft extends out from the rolled sheet material, leaving the coreless roll resting on a storage surface. At this point, the rolled sheet material may be collected and transported to a recycler in such a manner that the recycler need not unwind the coreless roll of material to remove a core.

The foregoing detailed description provides exemplary embodiments of the invention(s) and includes the best mode for practicing the invention(s). The description and illustration of these embodiments is intended only to provide examples of the invention(s), and not to limit the scope of the invention(s), or its protection, in any manner.

What is claimed is:

1. A coreless sheet material roller apparatus for attachment to a vehicle having at least two arms extending therefrom, said coreless sheet material roller apparatus for winding sheet material deployed on a deployed surface into a coreless roll, said coreless sheet material roller apparatus comprising:
   a main frame portion, a slide frame portion, and a winder assembly, the winder assembly having an arbor shaft, the arbor shaft rotatable about an axis, the axis about which the sheet material is wound onto the arbor shaft;
   said main frame portion configured for attachment to said at least two arms of said vehicle;
   said slide frame portion slidably connected to said main frame portion, wherein said slide frame portion is configured for sliding in a first direction, the first direction parallel with the axis, and sliding in a second direction, the second direction opposite the first direction; and
   the winder assembly operably attached to said slide frame, said arbor shaft further comprising a first end extending to a second end thereby defining a length, said first end of said arbor shaft operably connected to a motor, said motor configured for rotationally driving said arbor shaft in a first rotational direction and in a second rotational direction;
   wherein when said winder assembly is rotated in said first rotational direction, said sheet material is wound onto said arbor shaft to form said coreless roll; and
   wherein said main frame portion comprises a first wall and a second wall, said first wall defining a port therethrough, said port configured for slidably receiving said arbor shaft therethrough, and wherein said second wall of said main frame comprises a support configured for supporting said second end of said arbor shaft.

2. The coreless sheet material roller apparatus of claim 1, wherein said vehicle comprises a hydraulic control system, wherein said motor comprise a hydraulic motor hydraulically connected to said hydraulic control system, and wherein said roller apparatus comprises at least one hydraulic cylinder configured for slidably moving the main frame portion and the slide frame portion relative to one another.

3. The coreless sheet material roller apparatus of claim 1, wherein said first wall comprises at least one first deflector portion configured for guiding said sheet material onto said arbor shaft, and wherein said second wall comprises at least one second deflector portion configured for guiding said sheet material onto said arbor shaft.

4. The coreless sheet material roller apparatus of claim 1, further comprising a hydraulic control system, said hydraulic control system further comprising a hydraulic power source configured for supplying hydraulic fluid to at least one hydraulic cylinder, said hydraulic control system capable of extending and retracting said slide frame in said first direction, and in said second direction, said hydraulic control system further capable of rotating said arbor shaft in a first rotational direction and a second rotational direction.

5. The coreless sheet material roller apparatus of claim 1, wherein said arbor shaft is configured for connecting with a first portion of said sheet material and holding said first portion of said sheet material while said sheet material is initially wound onto said arbor shaft.

* * * * *